(No Model.)

J. L. O'CONNOR.
HAME FASTENER.

No. 505,843. Patented Oct. 3, 1893.

WITNESSES:
A. Whittle
Fred McDonald

INVENTOR
James L. O'Connor
BY C. E. McDonald
ATTORNEY.

UNITED STATES PATENT OFFICE.

JAMES L. O'CONNOR, OF NEW YORK, N. Y.

HAME-FASTENER.

SPECIFICATION forming part of Letters Patent No. 505,843, dated October 3, 1893.

Application filed November 14, 1891. Serial No. 411,962. (No model.)

*To all whom it may concern:*

Be it known that I, JAMES L. O'CONNOR, a citizen of the United States, residing at the city of New York, in the county of New York and State of New York, have invented a new and useful Improvement in Hame-Fasteners, of which the following is a specification.

The nature of the invention consists in the details of combination and construction substantially as illustrated in the accompanying drawings hereinafter described, and subsequently pointed out in the claim.

Figure 1:
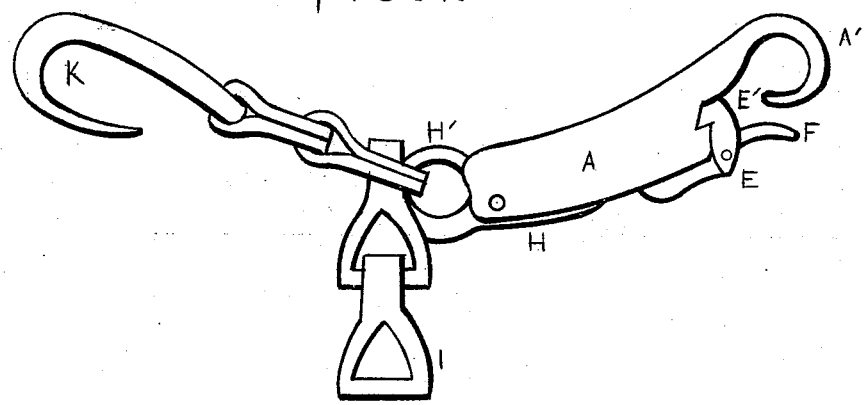
Figure 2:
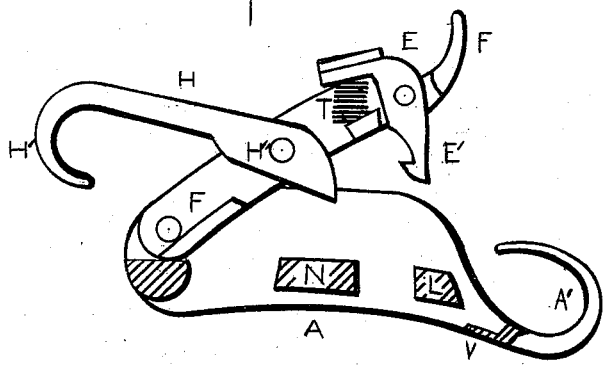
Figure 3:
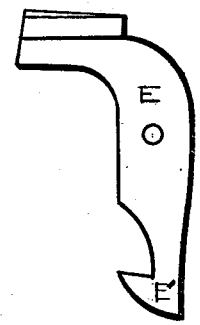

Figure 1, is a side view of one example of my newly invented hames fastener. Fig. 2, is a sectional view illustrating another example of the same. Fig. 3, is a detail view, illustrating the latch E, more fully hereinafter described.

The said fastener consists of two members, one described as follows: A. of Fig. 1. designates the body of the fastener. This is constructed with a hook A' at one end and a back and two sides as illustrated. The lever F. is pivoted by one end in said body. The other end of the said lever F. carries the spring latch E, which is adapted to engage a notch in the body A. The hook H. H'. is also pivoted to the said lever F. a little away from the fulcrum upon which the said lever is pivoted, the whole body being when closed as illustrated by Fig. 1. The other member of my said hames fastener consists of a chain I, with a hook K, on one end. The links of this chain I, are adapted to be engaged by the hook H'. This chain may be of any convenient form, but I prefer flat links, as illustrated.

To use my invention, the hook A', is hooked into the lower eye of the hames on one side, and the hook K. of the chain I into the corresponding eye on the other side of the hames, the parts of the body being in the position illustrated in Fig. 2. The hook H'. is then made to engage the proper link of the chain I. Then the body is closed into the position illustrated in Fig. 1. It will now be found that the hames will be drawn down snugly, and held firmly upon the collar. To open the said hames fastener, the operator presses down with his thumb on the top of the spring latch E, to throw it out of engagement with the notch in the body A, and then lifts the lever F with his fore fingers, thereby relaxing the strain of the hook K, on the chain I, so that said chain may be released.

The example of my invention illustrated by Fig. 2. differs from that illustrated in Fig. 1. only in the fact that the spring latch E, instead of catching into a notch in the body engages the cross-bar L. which serves it as a stop. In both examples the hook H. H' rests upon the stop N. when the body is closed, to keep it from being unsteady, and weaving about.

What I claim as my invention, and desire to secure by Letters Patent, is—

A hames fastener composed of two members one consisting of a body formed with a hook at one end and a back and sides as illustrated, a lever pivoted by one end in said body, a spring latch carried by the other end of said lever, and adapted to engage a stop in said body, and a hook pivoted upon said lever, and arranged and adapted to rest upon a stop within said body when closed, the other member consisting of a chain with links adapted to be engaged by the pivoted hook of said body, and provided with a hook at one end, all substantially as and for the purpose set forth.

In testimony that I claim the foregoing as my invention I have hereto signed my name, in presence of two witnesses, this 13th day of July, 1891.

JAS. L. O'CONNOR.

Witnesses:
J. WHITTLE,
FRED. MCDONALD.